L. D. B. SHAW.
Attachment for Lamp-Chimney.
No. 200,879. Patented March 5, 1878.
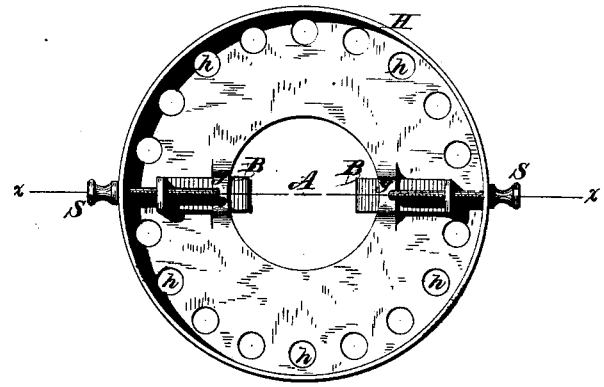
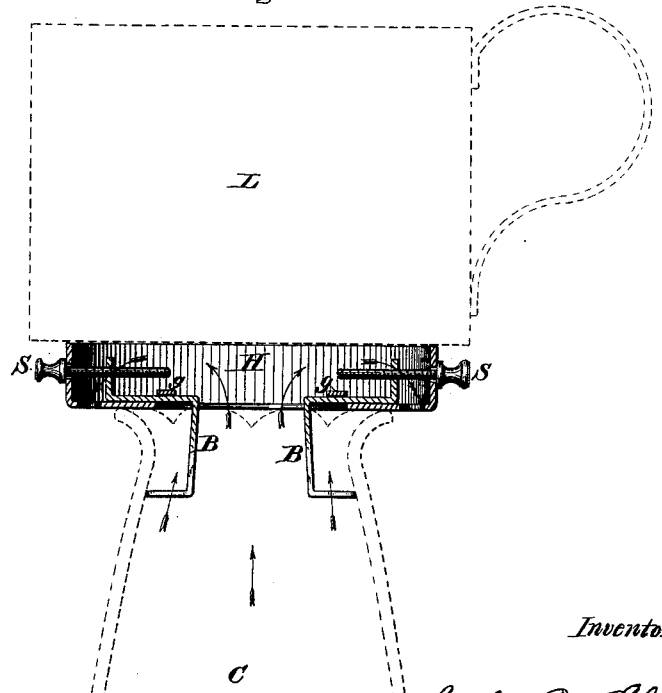
Witnesses
Harry King
Edward R. Tyler
Inventor.
L. D. B. Shaw,
By his Attorneys,
Stansbury & Munn.

UNITED STATES PATENT OFFICE.

LORENZO D. B. SHAW, OF BOSTON, MASSACHUSETTS.

IMPROVEMENT IN ATTACHMENTS FOR LAMP-CHIMNEYS.

Specification forming part of Letters Patent No. 200,879, dated March 5, 1878; application filed December 19, 1877.

*To all whom it may concern:*

Be it known that I, L. D. B. SHAW, of Boston, in the county of Suffolk and State of Massachusetts, have invented certain new and useful Improvements in Attachments for Lamp-Chimneys; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1 is a top or plan view of my improved heater. Fig. 2 is a vertical section on line $x\ x$ of Fig. 1.

The same parts are indicated by the same letters in both figures.

The nature of my invention consists in the peculiar construction of the heater hereinafter described, intended to be placed upon the top of a lamp-chimney, and to support a cup or other vessel the contents of which are to be heated, the main peculiarities being the adjustable device for attaching the heater to the chimney and the close sides and bottom vent of the hot-air chamber upon which the vessel to be heated rests.

In the drawing, H marks the heater, which is formed of a circular plate of metal having a close or solid rim turned up, as shown. A circular opening, A, is made in the center of the plate, and holes *h h h*, &c., are perforated around its perimeter. B B are braces, which slide radially under guides *g*, and are adjusted by means of the screws S S passing through the rim.

The heater thus constructed is placed on the top of a lamp-chimney, C, (shown in dotted lines in Fig. 2,) the braces B B being introduced into the top of the chimney and brought into contact with its inner surface by means of the adjusting-screws S S.

On the heater thus secured in position is placed a cup or vessel, L, as shown in dotted lines in Fig. 2. The bottom of the vessel and the close rim of the heater form a hot-air chamber, whose only vent is downward through the holes *h h*, &c., and is sufficient to keep the lamp from smoking while confining the greater part of the heat in the chamber and applying it to the bottom of the vessel L.

If the rim were perforated, the heat would have a tendency to escape without being utilized, and if the braces B B were applied closely to the outside of the chimney, the expansion of the glass would be likely to break it.

My improved heater is adapted for use in the nursery and sick-room.

What I claim is—

1. A heater constructed, as described, with a close rim and perforated bottom, and provided with adjustable braces to bear against the inside of the lamp-chimney, all constructed and operating as and for the purpose described.

2. In combination with a heater to be attached to the top of a lamp-chimney, sliding and adjustable braces made to bear against the inside of the chimney, in the manner and for the purpose specified.

In testimony that I claim the foregoing as my own I hereto affix my signature in presence of two witnesses.

LORENZO D. B. SHAW.

Witnesses:
J. M. CHAMBERLAIN,
B. WINSLOW PACKARD.